(12) United States Patent
Sincarsin

(10) Patent No.: US 9,121,447 B2
(45) Date of Patent: Sep. 1, 2015

(54) SINGLE AXIS ROTATIONAL GAS BEARING WITH FEED-THROUGH

(71) Applicant: Gedex Inc., Mississauga (CA)

(72) Inventor: Wayne G. Sincarsin, Richmond Hill (CA)

(73) Assignee: GEDEX INC., Mississauga (CA)

( * ) Notice: Subject to any disclaimer, the term of this patent is extended or adjusted under 35 U.S.C. 154(b) by 0 days.

(21) Appl. No.: 14/465,165

(22) Filed: Aug. 21, 2014

(65) Prior Publication Data

US 2015/0063731 A1 Mar. 5, 2015

Related U.S. Application Data

(60) Provisional application No. 61/870,808, filed on Aug. 28, 2013.

(51) Int. Cl.
*F16C 32/06* (2006.01)

(52) U.S. Cl.
CPC ......... *F16C 32/0618* (2013.01); *F16C 32/0696* (2013.01)

(58) Field of Classification Search
CPC .. F16C 32/06; F16C 32/0603; F16C 32/0614; F16C 32/0618; F16C 32/0696
See application file for complete search history.

(56) References Cited

U.S. PATENT DOCUMENTS

| | | |
|---|---|---|
| 2,683,635 A | 7/1954 | Wilcox |
| 4,030,784 A * | 6/1977 | King et al. ............... 384/114 |
| 4,704,712 A * | 11/1987 | Siryj ........................ 720/676 |
| 4,715,731 A * | 12/1987 | Tittizer .................... 384/100 |
| 4,749,283 A * | 6/1988 | Yokomatsu et al. ......... 384/12 |

(Continued)

FOREIGN PATENT DOCUMENTS

| | | |
|---|---|---|
| BE | 795275 | 8/1973 |
| CA | 1253553 | 5/1989 |

(Continued)

OTHER PUBLICATIONS

Patent Cooporation Treaty, Notification of Transmittal of the International Search Report and the Written Opinion of the International Searching Authority, or the Declaration, date, Nov. 27, 2014.

*Primary Examiner* — Alan B Waits
(74) *Attorney, Agent, or Firm* — Bereskin & Parr LLP/S.E.N.C.R.L., s.r.l.

(57) ABSTRACT

A rotational gas bearing allows rotation about a single axis while supplying a pressurized gas through the bearing. The gas bearing includes a gas supply member and a gas sink member. A cylindrical depression is located in one of the gas supply member and the gas sink member. A cylindrical protrusion protrudes from the other of the gas supply member and the gas sink member and is sized to fit within a cylindrical depression with a predetermined clearance. The gas supply bearing surface is opposed to the gas sink bearing surface. An opening is located in the gas supply bearing surface. A porous coating covers a portion of the gas supply bearing surface surrounding the opening. The porous coating communicates with the pressurized gas supply via the gas supply member for maintaining a bearing pressure between the porous coating and the gas sink bearing surface, such that the bearing pressure is greater than the feed pressure. An annular channel located in the gas sink bearing surface is aligned with and located opposite the opening, and communicates with the gas sink via the gas sink member.

17 Claims, 4 Drawing Sheets

(56) References Cited

U.S. PATENT DOCUMENTS

| | | | |
|---|---|---|---|
| 4,822,182 A * | 4/1989 | Matsushita et al. | 384/107 |
| 4,838,710 A * | 6/1989 | Ohta et al. | 384/100 |
| 5,488,771 A | 2/1996 | Devitt et al. | |
| 6,342,306 B1 * | 1/2002 | Ozawa et al. | 428/553 |
| 6,494,620 B1 * | 12/2002 | Sawaguchi et al. | 384/107 |
| 6,515,288 B1 * | 2/2003 | Ryding et al. | 250/441.11 |
| 6,658,083 B2 * | 12/2003 | Sai | 378/34 |
| 6,872,002 B2 * | 3/2005 | Tomita et al. | 384/12 |
| 7,908,885 B2 | 3/2011 | Devitt | |
| 8,427,021 B2 | 4/2013 | Devitt | |
| 2005/0269868 A1 * | 12/2005 | Kawai et al. | 303/2 |

FOREIGN PATENT DOCUMENTS

| | | |
|---|---|---|
| EP | 034280 | 8/1981 |
| EP | 158801 | 10/1985 |
| EP | 243037 | 10/1987 |
| EP | 2084416 | 5/2009 |
| GB | 2391498 | 2/2004 |
| JP | 2587227 B2 * | 3/1997 |
| JP | 2775454 B2 * | 7/1998 |
| KR | 101282436 | 7/2013 |
| WO | 2013103732 | 7/2013 |

* cited by examiner

SINGLE AXIS ROTATIONAL GAS BEARING WITH FEED-THROUGH

PRIOR APPLICATION

This application claims the benefit of U.S. Provisional Patent Application No. 61/870,808 filed on Aug. 28, 2013, which is incorporated by reference herein in its entirety.

FIELD

The disclosed embodiments pertain to the field of pressurized gas bearings and more particularly to the field of rotational pressurized gas bearings with a gas feed-through.

INTRODUCTION

There are many reasons that fluid bearings and gas bearings in particular are often chosen over mechanical bearings. For example, gas bearings can have nearly zero friction even at very low speeds as well as when starting or stopping, show near zero wear on the bearing surfaces and provide excellent isolation from mechanical vibrations. As such, one application for gas bearings is in providing a rotational joint with nearly zero friction rotational motion and excellent vibration isolation for a payload.

It can, however, be difficult to supply pressurized gas across a gas bearing to a gas sink on the rotating side. Traditionally, there have been three ways to accomplish this: by running a hose from a gas supply directly to the gas sink, through the use of slip rings and by including an additional gas supply on the rotating side of the gas bearing. The use of hoses limits the range of motion of the gas bearing to at most a few complete turns before the hose becomes tangle or twisted. Slip rings introduce friction and mechanical vibrations across the bearing, potentially negating some of the advantages provided by gas bearings. A separate gas supply on the rotating side of the gas bearing introduces extra mechanical complexity as well as additional weight and can also introduce mechanical vibrations and the need to supply electrical power to the rotating side of the gas bearing if a compressor is used.

SUMMARY

According to one embodiment, a rotational gas bearing for allowing rotation about a single axis while supplying a pressurized gas through the bearing is described. The gas bearing is configured for fluid communication with a pressurized gas supply and a gas sink. The gas bearing comprises, a gas supply member defining a gas supply bearing surface and a gas sink member defining a gas sink bearing surface. A cylindrical depression, defining one of the gas supply bearing surface and the gas sink bearing surface, is located in one of the gas supply member and the gas sink member. A cylindrical protrusion protrudes from the other of the gas supply member and the gas sink member and is sized to fit within the cylindrical depression with a predetermined clearance. The cylindrical protrusion defines the other of the gas supply bearing surface and the gas sink bearing surface. The gas supply bearing surface is opposed to the gas sink bearing surface. At least one opening, adapted for fluid communication with the pressurized gas supply at a feed pressure via the gas supply member, is located in the gas supply bearing surface. A porous coating covers a portion of the gas supply bearing surface surrounding the opening. The porous coating is adapted for fluid communication with the pressurized gas supply via the gas supply member for maintaining a bearing pressure between the porous coating and the gas sink bearing surface, the bearing pressure being greater than the feed pressure. An annular channel located in the gas sink bearing surface is aligned with and located opposite the opening, and is adapted for fluid communication with the gas sink via the gas sink member.

In another embodiment, the porous coating comprises a sintered material.

In another embodiment, the porous coating comprises at least one of brass and carbon.

In another embodiment, the porous coating comprises graphite.

In another embodiment, the predetermined clearance is chosen such that the gap between the porous coating and the gas sink bearing surface is between 5 µm and 50 µm.

In another embodiment, the predetermined clearance is chosen such that the gap between the porous coating and the gas sink bearing surface is between 12 µm and 25 µm.

In another embodiment, the pressurized gas comprises air.

In another embodiment, the pressurized gas comprises at least one of oxygen, nitrogen, helium, neon, argon, krypton and xenon.

In another embodiment, the feed pressure is approximately 30 kPa less than the bearing pressure.

In another embodiment, the bearing pressure is between 600 kPa and 1000 kPa and the feed pressure is between 570 kPa and 970 kPa.

In another embodiment, the width of the channel is greater than the width of the at least one opening.

In another embodiment, the annular channel extends around the circumference of the cylindrical protrusion.

In another embodiment, the cylindrical depression is in the gas supply member and the cylindrical protrusion protrudes from the gas sink member.

According to another embodiment, a rotational gas bearing for allowing rotation about a single axis while supplying pressurized gas through the bearing is described. The gas bearing is configured for fluid communication with a pressurized gas supply and a gas sink. The gas bearing comprises a gas supply member defining a gas supply bearing surface and a gas sink member defining a gas sink bearing surface. A depression, shaped as a first surface of revolution and defining one of the gas supply bearing surface and the gas sink bearing surface, is located in one of the gas supply member and the gas sink member. A protrusion, shaped as a second surface of revolution and defining the other one of the gas supply bearing surface and the gas sink bearing surface, protrudes from the other of the gas supply member and the gas sink member. The protrusion is sized to fit within the depression with a predetermined clearance. At least one opening, adapted for fluid communication with the pressurized gas supply at a feed pressure via the gas supply member, is located in the gas supply bearing surface. A porous coating covers a portion of the gas supply bearing surface. The porous coating is adapted for fluid communication with the pressurized gas supply via the gas supply member for maintaining a bearing pressure between the porous coating and the gas sink bearing surface, the bearing pressure being greater than the feed pressure. An annular channel in the gas sink bearing surface is aligned with and located opposite the opening. The channel is adapted for fluid communication with the gas sink via the gas sink member.

In another embodiment, the depression is a conical depression and the protrusion is a conical protrusion.

In another embodiment, the depression is a frusto-conical depression and the protrusion is a frusto-conical protrusion.

In another embodiment, the porous coating surrounds the opening.

DRAWINGS

For a better understanding of the described embodiments and to show more clearly how they may be carried into effect, reference will now be made, by way of example, to the accompanying drawings in which:

FIG. 1 shows a sectional view of one embodiment of a single axis rotational gas bearing with feed-through.

FIG. 3 shows a sectional view of another embodiment of a single axis rotational gas bearing with feed-through.

FIG. 4 shows a sectional view of another embodiment of a single axis rotational gas bearing with feed-through.

DESCRIPTION OF VARIOUS EMBODIMENTS

Figure 1:
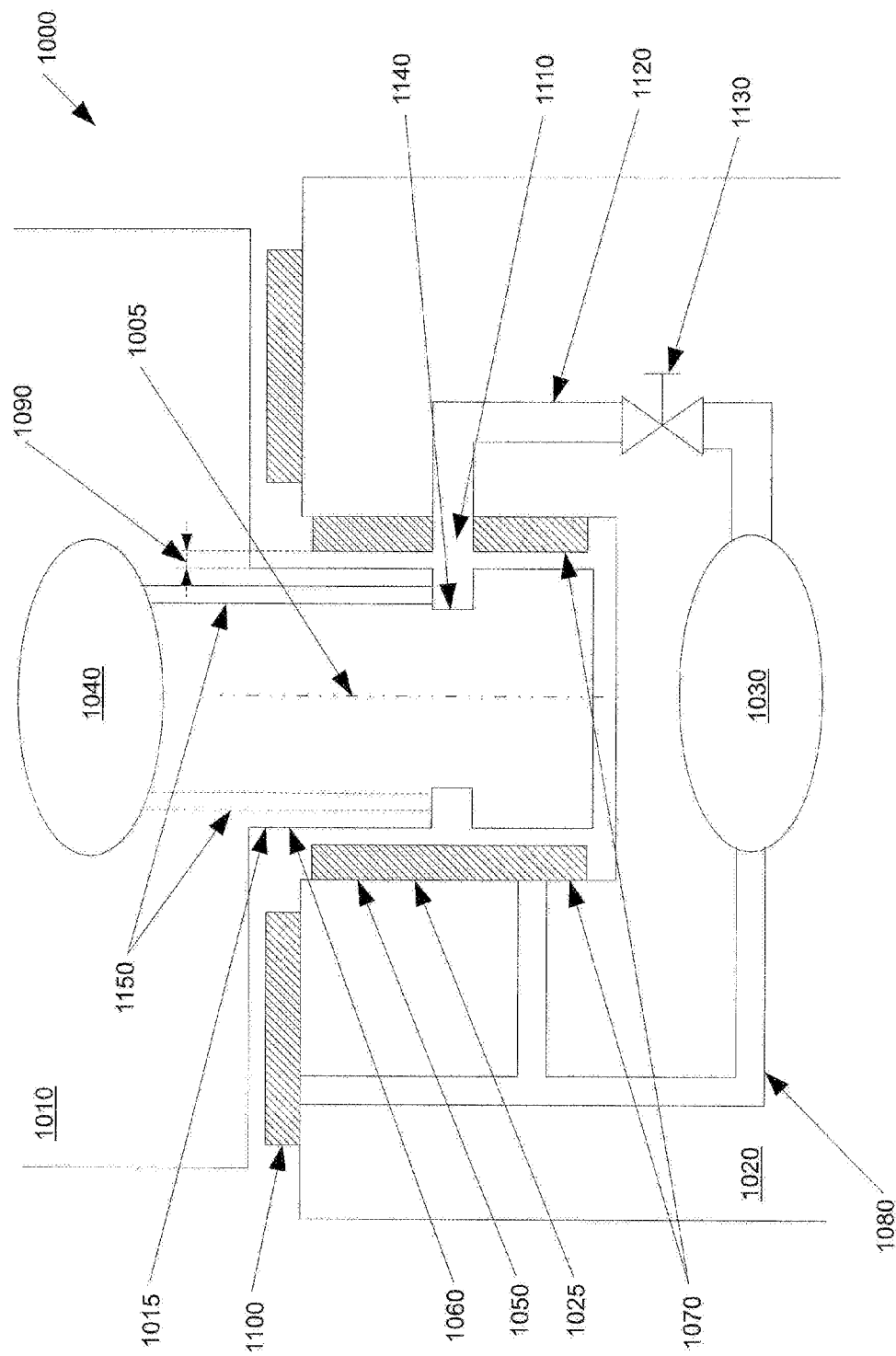

FIG. 1 shows a sectional view of one embodiment of a single axis rotational gas bearing with feed-through. Gas bearing 1000 allows free rotation of gas sink member 1010 relative to gas supply member 1020 about axis 1005 while supplying pressurized gas from pressurized gas supply 1030 on gas supply member 1020 to gas sink 1040 on gas sink member 1010. Gas sink 1040 may be any type of gas sink including, for example, other gas bearings aligned along different axes of rotation.

The gas used in gas bearing 1000 may be any suitable working gas. Preferably, the working gas will be air due to its readily available supply. Alternatively, one or a mixture of various other gases, such as nitrogen, oxygen, helium, neon, argon, krypton or xenon may also be used.

Pressurized gas supply 1030 comprises any suitable supply of pressurized gas capable of maintaining sufficient pressure (see below) during operation of gas bearing 1000. For example, pressurized gas supply 1030 may comprise a compressor with a supply of gas or a tank of pressurized and/or liquefied gas with a regulator. Preferably, the working gas is air so that a compressor drawing in ambient air may be used.

Continuing to refer to FIG. 1, gas bearing 1000 includes a cylindrical depression 1025 in gas supply member 1020, the interior surface of which has a gas supply bearing surface 1050. A corresponding cylindrical protrusion 1015 extends from gas sink member 1010. The exterior surface of the cylindrical protrusion 1015 includes a gas sink bearing surface 1060. The cylindrical protrusion 1015 is sized to fit within cylindrical depression 1025 with a predetermined clearance (described in further detail below). A porous coating 1070 is applied to the bearing surface 1050, and is connected to pressurized gas supply 1030 via bearing gas supply conduit 1080. Pressurized gas from pressurized gas supply 1030 escaping from porous coating 1070 into the gap 1090 between the porous coating 1070 and the gas sink bearing surface 1060 provides a cushion of pressurized gas, at a bearing pressure, that allows gas sink member 1010 to rotate with respect to gas supply member 1020 about the axis 1005 of gas bearing 1000.

Porous coating 1070 may include any material suitable for construction of gas bearings depending on the operating pressure and the working gas chosen. For example, porous brass or porous carbon such as graphite, may be used in construction of porous coating 1070. More generally, porous coatings constructed from sintered material may be suitable.

Supplemental bearings 1100, preferably also including a porous coating and connected to pressurized gas supply 1030, may be used to prevent gas supply member 1020 from contacting gas sink member 1010.

The predetermined clearance is selected to balance the volume of pressurized gas required with the difficulty of manufacturing the gas bearing. A smaller gap between porous coating 1070 and gas sink bearing surface 1060 results in lower gas losses to maintain the cushion of pressurized gas, but is also more difficult to manufacture. It has been found that the predetermined clearance should be chosen so that the gap between the porous coating 1070 and the gas sink bearing surface 1060 in FIG. 1, is between 5 µm and 50 µm, and preferably between 12 µm and 25 µm.

Opening 1110 is located in the gas supply bearing surface 1050 and the porous coating 1070. Opening 1110 is connected to pressurized gas supply 1030 via feed gas supply conduit 1120 and feed gas pressure regulator 1130.

The gas pressure in the feed gas supply conduit 1120 at opening 1110 (also referred to as the "feed pressure") is regulated by pressure regulator 1130 to be less than the bearing pressure between porous coating 1070 and gas sink bearing surface 1060. Preferably, the feed pressure is approximately 30 kPa (4-5 psi) less than the bearing pressure. In one embodiment the feed pressure is maintained between 570 kPa (approximately 85 psi) and 970 kPa (140 psi) while the bearing pressure is correspondingly maintained between 600 kPa (approximately 90 psi) and 1000 kPa (approximately 145 psi).

Channel 1140 is cut into the gas sink bearing surface 1060, around the circumference of the cylindrical protrusion 1015 and opposite to opening 1110. Channel 1140 is connected to gas sink 1040 via gas sink conduit 1150. Additional gas sink conduits 1150 spaced around the circumference of the cylindrical protrusion 1015 may be used so that, as gas sink member 1010 rotates with respect to gas supply member 1020, the pressure variations experienced by gas sink 1040 are minimized.

Preferably, the width of opening 1110 and the width of channel 1140 are approximately equal.

In an alternate embodiment, opening 1110 may be extended around the circumference of cylindrical depression 1025 to form a channel in gas supply bearing surface 1050, opposed to channel 1140 in gas sink bearing surface 1060 and connected to pressurized gas supply 1030 through multiple openings 1110.

In operation, pressurized gas is supplied to porous coating 1170 and optionally to supplemental bearings 1100 from pressurized gas supply 1030 via bearing gas supply conduit 1080. This maintains a bearing pressure between porous coating 1070 and gas sink bearing surface 1060. Pressurized gas supply 1030 also supplies pressurized gas to opening 1110 at a regulated feed pressure that is less than the bearing pressure. Pressurized gas at the feed pressure passes from opening 1110 into channel 1140 and on to gas sink 1040.

Figure 2:
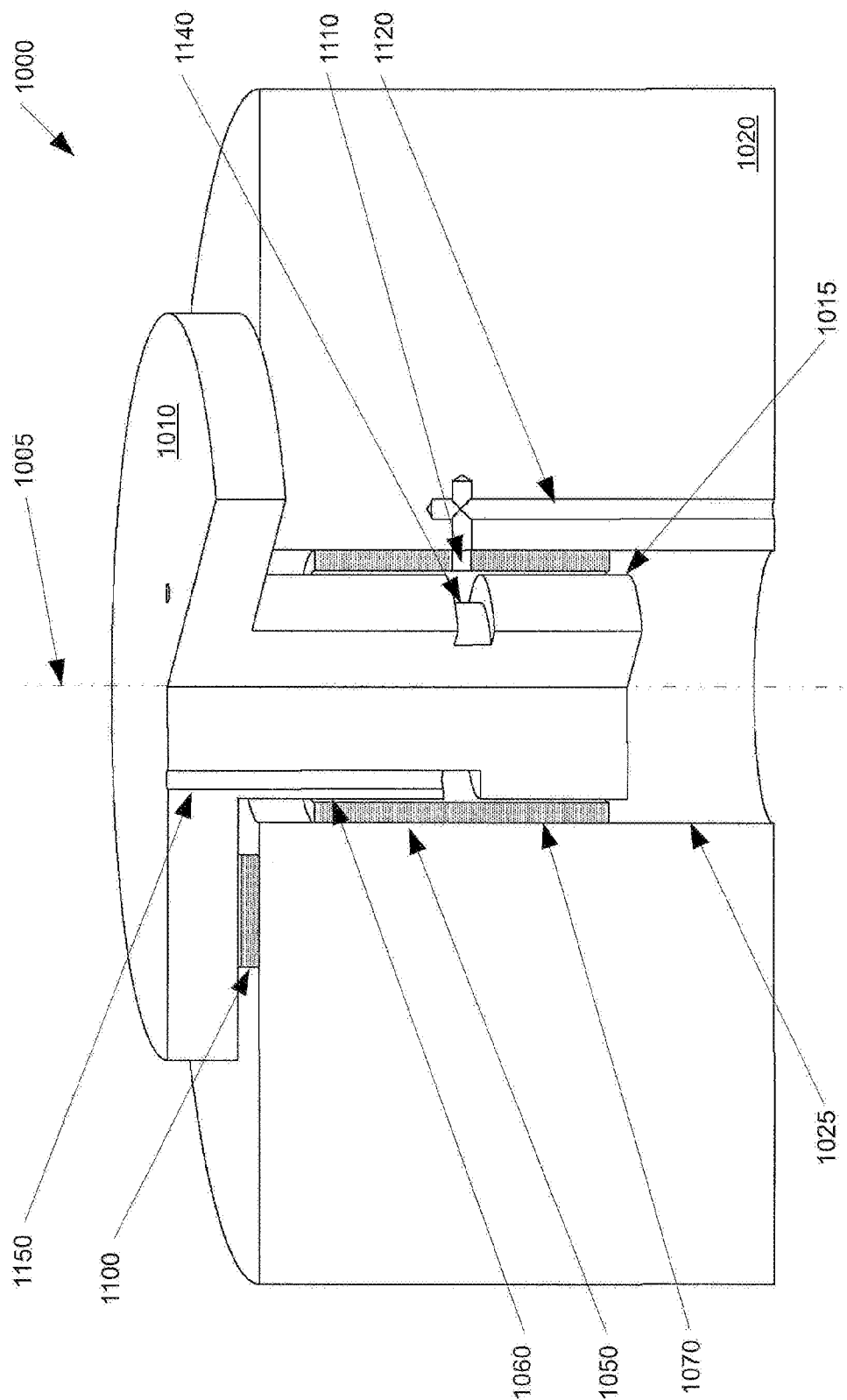
FIG. 2 shows a perspective cut-away view of the embodiment of a single axis rotational gas bearing with feed-through depicted in FIG. 1.

FIG. 2 shows a perspective cut-away view of the embodiment of a single axis rotational gas bearing with feed-through depicted in FIG. 1. Like numbers refer to like parts. For simplicity of illustration, the pressurized gas supply, bearing gas supply conduit and pressurized gas sink are not shown.

Figure 3:
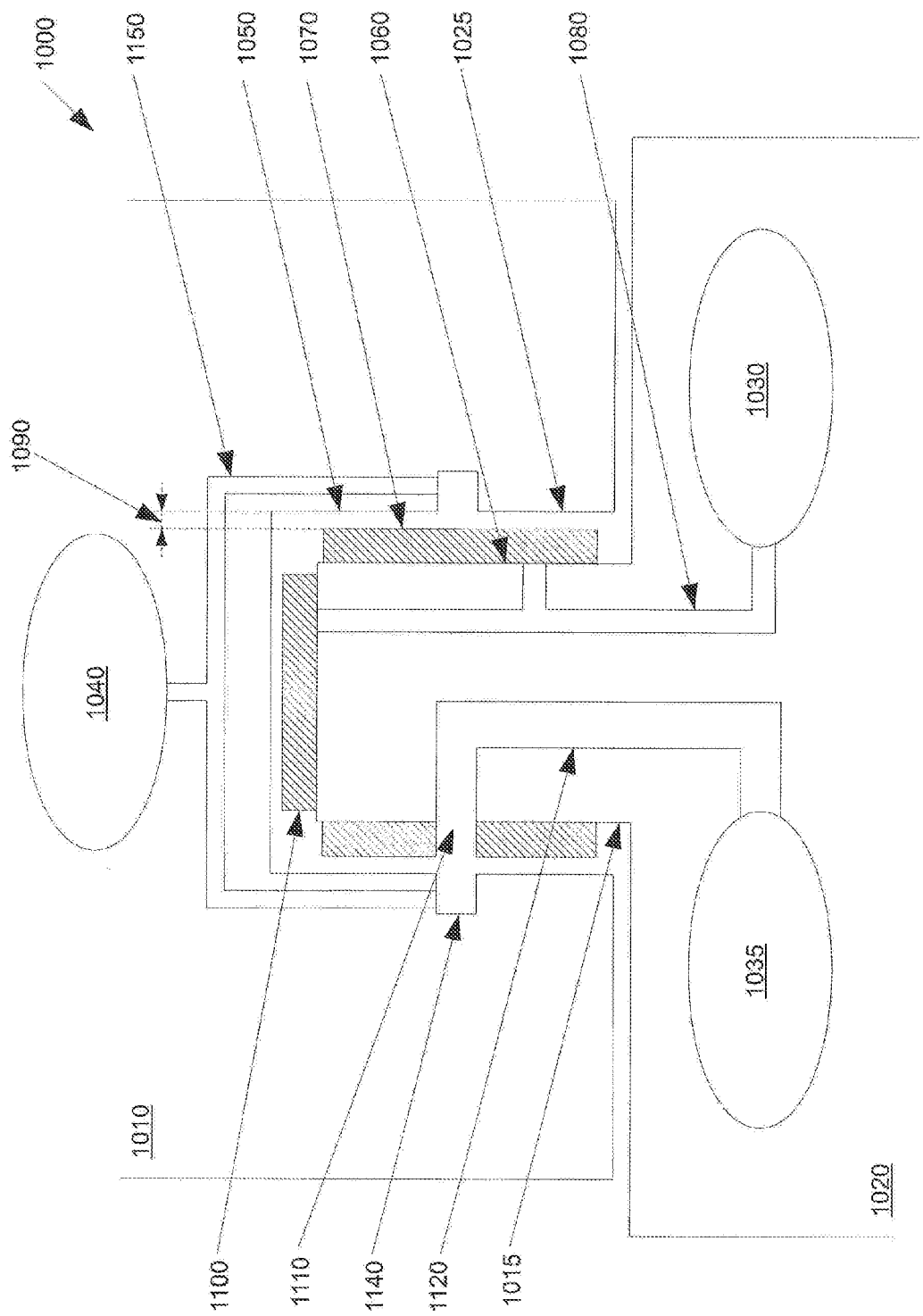

FIG. 3 shows a sectional view of another embodiment of a single axis rotational gas bearing with feed-through. Again, like numbers refer to like components. In contrast with the previous embodiment, porous coating 1070 and supplemental bearings 1100 are supplied from pressurized gas supply 1030 while opening 1110 is supplied by pressurized gas supply 1035, where the gas pressure of pressurized gas supply 1035 is less than the bearing pressure. In addition, as shown in FIG. 3, it is possible to invert the geometry of the embodiment in FIG. 1 to have the cylindrical depression 1025 in gas sink member 1010 and the cylindrical protrusion 1015 in gas supply member 1020. Porous coating 1070 may be located on either of the bearing surface 1050, similar to the configuration in FIG. 1, or the bearing surface 1060 as shown in FIG. 3 so long as the porous coating is on the gas supply member.

Figure 4:
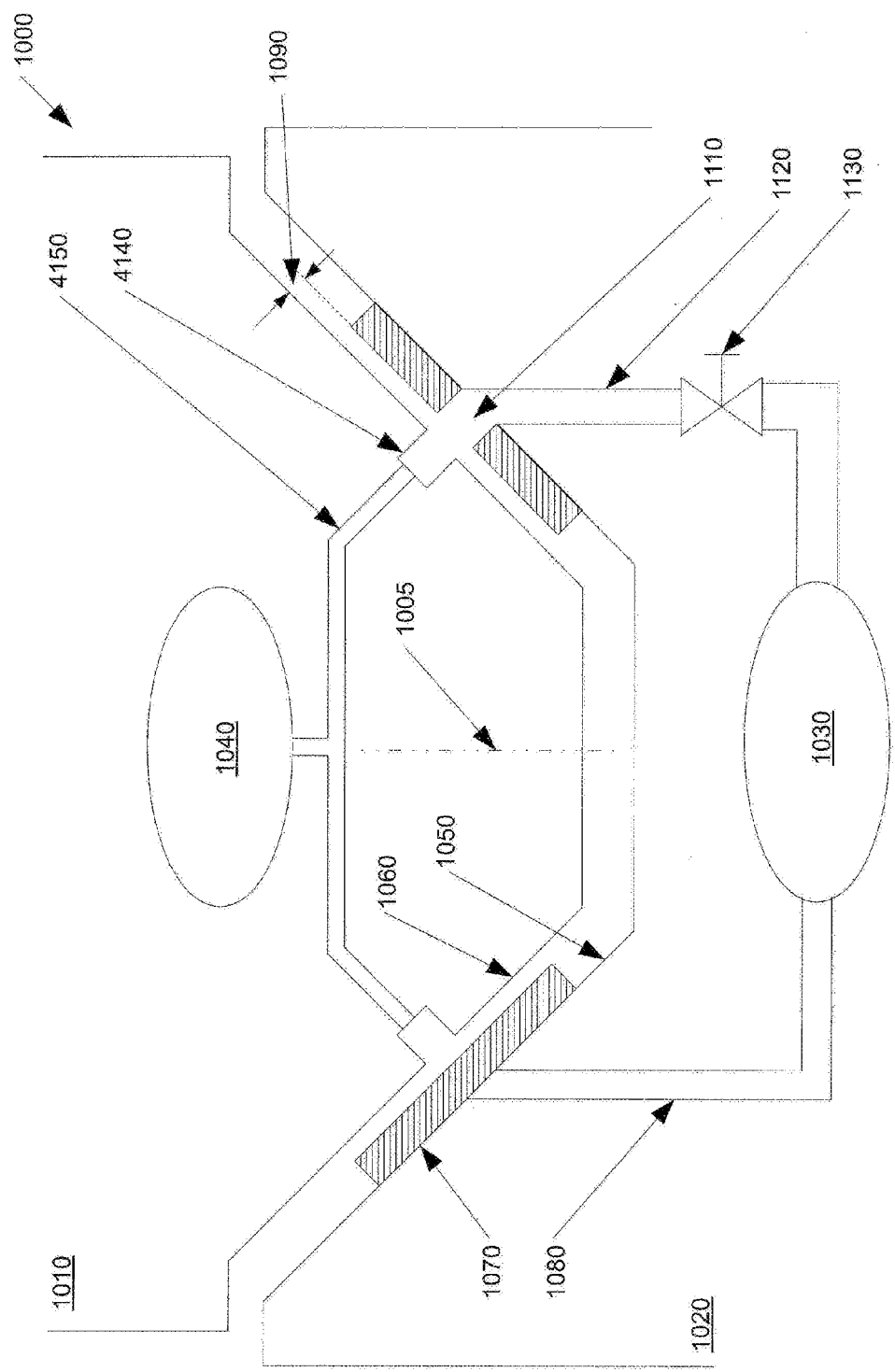

FIG. 4 shows a sectional view of another embodiment of a single axis rotational gas bearing with feed-through, where like numbers refer to like components. Those of skill in the art will now understand that the previously described geometry of cylindrical depression 1025 and protrusion is not the only viable geometry. Conical or frusto-conical geometry, as shown in FIG. 4, may also be used. Since gas supply bearing surface 1050 and gas sink bearing surface 1060 are sloped, the conical or frusto-conical geometry combines the functionality of supplemental bearings with porous coating 1070.

More generally, those of skill in the art will now recognize that it is possible to construct a single axis rotational gas bearing with feed-through according to the present description using any surface of revolution as a base shape.

The specific embodiments described here are examples only, and are not intended to be an exhaustive list of all possible constructions of a single axis gas bearing with feed-through. Those of skill in the art will recognize that the features described herein may be combined or rearranged in different ways to produce similar results.

The invention claimed is:

1. A rotational gas bearing for allowing rotation about a single axis while supplying pressurized gas through the bearing, the gas bearing being configured for fluid communication with a pressurized gas supply and a gas sink, the gas bearing comprising:
   a) a gas supply member defining a gas supply bearing surface;
   b) a gas sink member defining a gas sink bearing surface;
   c) a depression in one of the gas supply member and the gas sink member, the depression being shaped as a first surface of revolution, the depression defining one of the gas supply bearing surface and the gas sink bearing surface;
   d) a protrusion protruding from the other of the gas supply member and the gas sink member, the protrusion shaped as a second surface of revolution, the protrusion sized to fit within the depression with a predetermined clearance, the protrusion defining the other one of the gas supply bearing surface and the gas sink bearing surface;
   e) at least one opening in the gas supply bearing surface, the opening adapted for fluid communication with the pressurized gas supply at a feed pressure via the gas supply member;
   f) a porous coating covering a portion of the gas supply bearing surface, the porous coating adapted for fluid communication with the pressurized gas supply via the gas supply member for maintaining a bearing pressure between the porous coating and the gas sink bearing surface, the bearing pressure being greater than the feed pressure;
   g) an annular channel in the gas sink bearing surface aligned with and located opposite the opening, the channel adapted for fluid communication with the gas sink via the gas sink member.

2. The rotational gas bearing of claim 1 wherein the depression is a conical depression and the protrusion is a conical protrusion.

3. The rotational gas bearing of claim 1 wherein the depression is a frusto-conical depression and the protrusion is a frusto-conical protrusion.

4. The rotational gas bearing of claim 1, wherein the porous coating surrounds the opening.

5. A rotational gas bearing for allowing rotation about a single axis while supplying a pressurized gas through the bearing, the gas bearing being configured for fluid communication with a pressurized gas supply and a gas sink, the gas bearing comprising:
   a) a gas supply member defining a gas supply bearing surface;
   b) a gas sink member defining a gas sink bearing surface;
   c) a cylindrical depression in one of the gas supply member and the gas sink member, the cylindrical depression defining one of the gas supply bearing surface and the gas sink bearing surface;
   d) a cylindrical protrusion protruding from the other of the gas supply member and the gas sink member, the cylindrical protrusion sized to fit within the cylindrical depression with a predetermined clearance, the cylindrical protrusion defining the other of the gas supply bearing surface and the gas sink bearing surface, wherein the gas supply bearing surface is opposed to the gas sink bearing surface;
   e) at least one opening in the gas supply bearing surface, the opening adapted for fluid communication with the pressurized gas supply at a feed pressure via the gas supply member;
   f) a porous coating covering a portion of the gas supply bearing surface surrounding the opening, the porous coating being adapted for fluid communication with the pressurized gas supply via the gas supply member for maintaining a bearing pressure between the porous coating and the gas sink bearing surface, the bearing pressure being greater than the feed pressure;
   g) an annular channel in the gas sink bearing surface aligned with and located opposite the opening, the channel adapted for fluid communication with the gas sink via the gas sink member.

6. The rotational gas bearing of claim 5 wherein the porous coating comprises a sintered material.

7. The rotational gas bearing of claim 5 wherein the porous coating comprises at least one of brass and carbon.

8. The rotational gas bearing of claim 7 wherein the porous coating comprises graphite.

9. The rotational gas bearing of claim 5 wherein the predetermined clearance is chosen such that the gap between the porous coating and the gas sink bearing surface is between 5 µm and 50 µm.

10. The rotational gas bearing of claim 8 wherein the predetermined clearance is chosen such that the gap between the porous coating and the gas sink bearing surface is between 12 µm and 25 µm.

11. The rotational gas bearing of claim 5 wherein the pressurized gas comprises air.

12. The rotational gas bearing of claim 5 wherein the pressurized gas comprises at least one of oxygen, nitrogen, helium, neon, argon, krypton and xenon.

13. The rotational gas bearing of claim 5 wherein the feed pressure is approximately 30 kPa less than the bearing pressure.

14. The rotational gas bearing of claim 13 wherein the bearing pressure is between 600 kPa and 1000 kPa and the feed pressure is between 570 kPa and 970 kPa.

15. The rotational gas bearing of claim 5 wherein the width of the channel is greater than the width of the at least one opening.

16. The rotational gas bearing of claim 5 wherein the annular channel extends around the circumference of the cylindrical protrusion.

17. The rotational gas bearing of claim 16 wherein the cylindrical depression is in the gas supply member and the cylindrical protrusion protrudes from the gas sink member.

* * * * *